3,037,996
7-DEHYDROSTEROLS
Howard Klein, Brooklyn, N.Y., and Roland Kapp, Williamsport, Pa., assignors to Nopco Chemical Company, Newark, N.J., a corporation of New Jersey
No Drawing. Filed Feb. 13, 1961, Ser. No. 88,675
15 Claims. (Cl. 260—397.2)

This invention relates to an improved process for producing 7-dehydrosterols and more particularly to an improved process for the dehydrohalogenation of halogenated sterol compounds.

Since the discovery by Ziegler (Annalen 551, 80–119) that the halogenation of organic compounds at a carbon atom alpha to a double bond could be accomplished by using compounds such as N-halogenated acid amides and imides as halogenating agents, a great deal of research has been carried out on the application of this reaction to the production of 7-dehydro derivatives of various sterol compounds. The greater part of this work has been directed to the production of 7-dehydrocholesterol. As is well known, 7-dehydrocholesterol is readily converted to vitamin $D_3$ by irradiation with ultra-violet light. In order to form 7-dehydrocholesterol from the halogenated cholesterol compounds produced in accordance with the Ziegler process, it is necessary to subject the halogenated sterol compounds to dehydrohalogenation with a suitable dehydrohalogenating agent. The compounds which have been most frequently employed to react with the halogenated sterol derivatives to effect dehydrohalogenation are organic compounds such as dimethylaniline, diethylaniline, collidine and quinoline. Compounds such as trimethylamine triethylamine, N,N-dipropylaniline, N-ethylpiperidine and N,N-diethylcyclohexylamine have also been employed for this purpose. However, these attempts have been considered unsuccessful due to the high degree of impurity of the resultant product and the low yield of product produced. Furthermore, these organic bases when employed as dehydrohalogenation agents tended to give results that were not reproducible.

More recently U.S. Patent No. 2,546,787, Ruigh et al., March 27, 1951, and U.S. Patent No. 2,546,788, Schaaf, March 27, 1951, have disclosed the use of quinaldine for this purpose. The use of this compound has made possible the realization of increased yields of 7-dehydrocholesterol of greater purity than could be obtained prior to the use of quinaldine as a dehydrohalogenation agent. However, like others of the previously known dehydrohalogenating agents, quinaldine is not as readily available as is desirable and it is expensive to use because of its high initial cost.

For example, in U.S. Patent No. 2,546,788, referred to hereinabove Example XII clearly illustrates the deleterious effects which impurities have on the effectiveness of quinaldine as a dehydrohalogenating agent. In the example quinaldine which had only 2.5 percent impurities was used to dehydrohalogenate crude 7-bromocholesteryl benzoate. The resulting 7-dehydrocholesterol had a purity of only 59.7 percent and yielded only 61.1 percent of the desired 7-dehydrocholesterol. Therefore, it is readily seen that to be effective as a dehydrohalogenating agent, quinaldine must be in a very pure state. Also, quinaldine will deteriorate on standing since it is subject to air oxidation. In addition it is rather hygroscopic and precautions must be taken to keep it relatively free of moisture in order to obtain the best results. These disadvantages greatly limit the use of quinaldine as a dehydrohalogenation agent owing to the need for purifying the quinaldine to obtain a very pure material prior to use in these processes. Thus the purchase and storage of large quantities of quinaldine when the market price is low, for later use, is rendered impractical.

Comparatively few attempts have been made by the prior art to use inorganic materials, such as the metal salts or metal hydroxides, or organo-metallic compounds, such as sodium acetate, as dehydrohalogenating agents. Those attempts which have been made have been relatively unsuccessful inasmuch as the yields realized were negligible and the products obtained were not of a high degree of purity. That is, dehydrohalogenation processes carried out using such agents have generally resulted in the decomposition of the halogenated sterol compound with attendant darkening of the reaction mixture and the evolution of hydrogen halide. For these reasons the principal efforts of the prior art have been directed towards the development of various organic reagents for use in effecting the dehydrohalogenation of halogenated sterol compounds.

U.S. Patent No. 2,846,829, Klein et al., December 16, 1958 discloses the use of alanate salts such as alkali metal and alkaline earth metal salts of $\alpha$-alanine and $\beta$-alanine as dehydrohalogenation agents, for dehydrohalogenating halogenated sterol compounds. These salts are very expensive and cannot be directly reused, since they are converted to free alanine, unless they are reconverted. Hence, for reuse, it is necessary to convert the alanine to the desired salt. Furthermore these salts are heterogeneous catalysts which are very sensitive and therefore tend to give results which are not reproducible.

It is the object of this invention to provide a new and valuable improvement in the process for producing 7-dehydrosterols.

It is a further object of this invention to provide a new and highly improved process for the dehydrohalogenation of halogenated sterol derivatives using a readily available and highly effective dehydrohalogenating agent.

Other objects of this invention will in part be obvious and will in part appear hereinafter.

We have discovered that the above and other objects of the invention may be realized if the dehydrohalogenation of a halogenated sterol compound is effected by reacting the halogenated sterol compound with hexamethylene tetramine. The yields of the desired 7-dehydrosterol compounds which are obtained in this manner are substantially higher or as high as when the dehydrohalogenation is carried out in accordance with the procedures of the prior art. Furthermore, the products which are obtained according to the process described herein are generally of considerably higher purity than the products obtained when the dehydrohalogenation is carried out in accordance with the procedures of the prior art. Moreover, hexamethylene tetramine is very inexpensive and is commercially available thus rendering the process of our invention very economical to operate. When the hexamethylene tetramine is used as a dehydrohalogenating agent as outlined above, the resulting amine halide salt may be discarded since hexamethylene tetramine is so cheap and readily available.

As we have stated above, it is possible to obtain considerably higher yields or as high yields of the desired 7-dehydrosterol compound by effecting the dehydrohalogenation of the halogenated sterol compound by merely reacting the desired halogenated sterol compound with hexamethylene tetramine. The yields obtained in this manner are often higher by as much as 50% or more than the yields obtained when the dehydrohalogenation is carried out in using some of the prior art dehydrohalogenating agents referred to above. The yields obtained by using hexamethylene tetramine are as high as the yields obtained when pure quinaldine itself is used. Furthermore, when commercially available hexamethylene tetramine is used as dehydrohalogenating agent, it does not need to be purified. Due to the severe deterioration of pure quinaldine on storage, it must be purified if it has been standing for a protracted period of time. Such purification steps are costly and time consuming.

The amount of hexamethylene tetramine which is employed in the reaction should be sufficient, of course, to react completely with the halogenated sterol compound which is to be dehydrohalogenated, i.e. at least a mole to mole ratio should be employed. As a matter of convenience, it is usually preferred to use an excess of hexamethylene tetramine over the amount theoretically required to bring about the dehydrohalogenation of the halogenated sterol. Thus from about three moles to about six moles of hexamethylene tetramine per mole of halogenated sterol compounds is conveniently employed. Larger amounts of hexamethylene tetramine per mole of halogenated sterol compound may be employed, if desired, but the use of such larger amounts is not necessary. In order to obtain the most consistent results, it is preferred that hexamethylene tetramine be used in a reasonably pure state.

The hexamethylene tetramine which is used in this invention is commercially available. However it may be produced by reacting formaldehyde and ammonia and recovering the hexamethylene tetramine so formed. The hexamethylene tetramine so obtained is itself in a high state of purity and can be used directly to effect the dehydrohalogenation of halogenated compounds.

Furthermore, the hexamethylene tetramine used in this invention acts as homogeneous catalyst and enables us to obtain uniform results, no matter what method of preparation of hexamethylene tetramine is used. Therefore, this invention is not limited by the source of or means of preparing the hexamethylene tetramine. When the hexamethylene tetramine is prepared by the methods given above it is of a suitable purity and will consistently give excellent results when employed to bring about the dehydrohalogenation of a halogenated sterol compound. If desired however, hexamethylene tetramine containing appreciable amounts of impurities can be employed successfully in the process of the invention.

The dehydrohalogenation process of the present invention is preferably carried out in an inert hydrocarbon solvent solution of the halogenated sterol derivative and the hexamethylene tetramine used. Among the many such hydrocarbon solvents which are suitable for use in our novel process there may be mentioned benzene, toluene, xylene, methyl isopropyl benzene, isopropyl benzene, ethyl benzene, diethyl benzene, mesitylene, butyl benzene, amyl benzene, naphthalene, pinene, heptane, octane, petroleum ether, dichloroethane, chlorobenzene, cyclohexane, etc. The amount of solvent when used preferably should be at least about equal to the volume of the halogenated sterol derivative and the hexamethylene tetramine. Generally, the most satisfactory results are obtained when the volume of the solvent which is employed is from about 5 to 15 times as great as the volume of the hexamethylene tetramine which is employed. If desired, ratios of solvent to hexamethylene tetramine greater than 15 to 1 may be employed though such higher ratios are not necessary. In the preferred embodiment of our invention, we use xylene as a solvent.

In carrying out the process of the invention, it is necessary to heat the mixture of hexamethylene tetramine and halogenated sterol compound in order to bring about dehydrohalogenation. In most cases, it is preferred to heat the reaction mixture to a temperature of about 90° C. to 100° C., e.g., on a steam bath. The reaction can be carried out, however, at temperatures between about 80° C. to about 150° C. and temperatures higher than 150° C. can be employed if desired, although such higher temperatures are not required. The length of time of heating the reaction mixtures will vary somewhat depending upon the temperature at which the reaction is carried out. We prefer to heat for about 10 minutes when a refluxing temperature is maintained. At higher temperatures, shorter periods of heating may be employed.

After the dehdrohalogenation reaction has been accomplished, the desired 7-dehydrosterol may be recovered from the dehydrohalogenation reaction mixture in any convenient manner. The exact method employed for isolating the 7-dehydrosterol compound will depend to some extent upon the specific derivative of the sterol employed as the starting material in the process. It is quite well known that a sterol compound prior to being subjected to halogenation in accordance with the Zeigler process must be treated in some manner or other so as to convert the hydroxyl group on the 3 position to a group which will not be determinentally affected by the halogenating agent but which can conveniently be reconverted to a hydroxyl group. Thus the hydroxyl group may be converted to an ester group or to an ether group or it may be replaced with any other suitable inactive group which may later be split off with reformation of the hydroxyl group at the 3 position. The most common practice in the prior art and what appears to be the most suitable and most feasible practice is to convert the hydroxyl group to an ester group by esterification with an efficient esterifying agent such as acetic anhydride, benzoyl chloride, or the like. If the sterol compound has been converted to an ester thereof, the sterol is reformed by a simple hydrolysis of the ester group by saponification with aloholic alkali. One practice in the prior art as shown by British Patent No. 574,432 and by U.S. Patent No. 2,441,091 and its French counterpart, French Patent No. 901,551 has been to remove the dehydrohalogenating agent from the reaction mixture prior to carrying out the saponification of the ester of the sterol compound. This is accomplished according to these prior art patents either by a process involving admixing the reaction mixture with an excess of an aqueous acid solution and extracting this mixture with a solvent such as ether or a hydrocarbon solvent to remove the 7-dehydrosterol ester from the aqueous mixture or it is accomplished by a process involving the admixture of the dehydrohalogenation reaction mixture with an excess of a water-immiscible solvent such as petroleum ether and then extracting that mixture with an aqueous acid solution to remove the dehydrohalogenation agent from the solvent solution. In either case the solvent solution containing the 7-dehydrosterol ester is then washed with a dilute alkali solution to remove any acid dissolved in the solvent and thereafter the solvent solution is washed with water to remove any alkali dissolved in the solvent. Thereafter, the solvent is evaporated to recover the 7-dehydrosterol ester since the solvent which has been used in separating the ester from the dehydrohalogenation reaction mixture is generally a solvent which is not well suited as a vehicle in which to carry out the saponification of the ester to form the free sterol. After the ester has been isolated it is then hydrolyzed with an alcoholic alkali solution. In all of the specific examples given hereinafter, the general procedure of the prior art is employed to separate the crude 7-dehydrosterol esters from the dehydrohalogenation reaction mixtures containing the ester.

This was accomplished by washing the solvent solution of the dehydrohalogenation mixture with an aqueous acid solution of a 1 to 1 mixture of concentrated hydrochloric acid to remove all acid soluble and water soluble components such as any excess hexamethylene tetramine and amine halogen salt formed by the dehydrohalogenation of the 7-bromocholesteryl benzoate. Thereafter the solvent solution of the sterol ester was admixed with acetone which is readily adapted for crystallizing the sterol ester. The solution containing the solvent solution of the 7-dehydrocholesteryl benzoate and acetone was then cooled to a relatively low temperature from about −5° C. to about −10° C. overnight which resulted in complete crystallization of the sterol ester. Thereafter the crystallized ester was recovered by a simple filtration procedure. The sterol ester may then be hydrolyzed in the same fashion as in the prior art procedures to get the 7-dehydrosterol.

Other means of recovering the 7-dehydrosterol can, of course, be employed. However, in commercial practice, it is preferable to carry out the saponification of the esters in accordance with the process which is disclosed in U.S. Patent Number 2,542,291, Schaaf, February 20, 1951. This process eliminates entirely the separation of the 7-dehydrosterol ester from the dehydrohalogenating agent prior to effecting the saponification of the ester. Instead, the saponification is carried out directly in the reaction mixture obtained from the dehydrohalogenation reaction by dissolving the dehydrohalogenation reaction mixture in an excess of an alcoholic alkali solution wherein the alcohol is one containing not more than 4 carbon atoms, saponifying the 7-dehydrosterol ester in the resulting mixture, and cooling the solution to a temperature somewhat below room temperature whereupon the free 7-dehydrosterol crystallizes from the solution in a relatively high state of purity. Any other suitable means of carrying out the saponification of 7-dehydrosterol esters can, of course, be employed.

As mentioned above, it is common practice to block the hydroxyl group on the 3 position of the sterol compounds during the halogenation reaction by converting the hydroxyl group to a group which will not react with the dehydrohalogenating agent but which may be later reconverted to the hydroxyl group. For convenience, the term "inactive group" will be used herein in referring to such a group. For the purposes of the present invention, it is of course, entirely immaterial just what inactive group is used to protect the 3 position of the sterol compound since the reaction between the halogenated sterol compound and the hexamethylene tetramine involves, of course, the removal of the halogen atom from the 7 position on the sterol compound and the removal of the hydrogen atom from the 8 position of the sterol compound.

The specific examples given hereinafter show the use of the halogenated benzoate esters of cholesterol in the process of the invention. These examples are only illustrative and the reaction which takes place between this halogenated ester and the hexamethylene tetramine takes place with equal efficiency and ease between the hexamethylene tetramine and any other sterol compound having a double bond between the 5 and 6 carbon atoms and a halogen atom on the 7 carbon atom. Thus the process of our invention is quite suitable for and is very effective in dehydrohalogenating any sterol compounds of this nature regardless of whether they are the esters, the ethers or any other suitable derivatives of the particular sterol compound being dehydrohalogenated. Furthermore, as far as the esters are concerned, any of the various sterol esters which may be formed can be dehydrohalogenated by the process of our invention. Among the sterol esters which have been utilized in the prior art patents and which are quite suitable for use in the process of our invention, there may be mentioned the formate, the oxalate, the propionate, the butyrate, and the stearate esters of the halogenated sterol compounds as well as the acetate and benzoate esters thereof.

For a fuller understanding of the nature and objects of the invention, reference may be had to the following examples which are given merely as further illustrations of the invention and are not to be construed in a limiting sense.

The purity of all products when listed in the following examples was obtained by spectographic analysis, all points on the spectographic curve falling in line with the desired product.

*Example I*

To a refluxing solution of 25 grams of hexamethylene tetramine and 125 ml. of xylene was added 25 grams of approximately 80 percent pure 7-bromocholesteryl benzoate. After the reaction had proceeded for 90 minutes, the solution was cooled to 45° C. and the water soluble components of the solution were removed by washing with water. The xylene solution was added to 785 ml. of acetone and chilled overnight at a temperature of from between —5° C. and —10° C. A yield of 7.0 grams of 7-dehydrosterol benzoate having a purity of 92.7% was obtained.

*Example II*

To a refluxing solution of 25 grams of hexamethylene tetramine and 125 ml. of xylene was added 25 grams of approximately 80 percent pure 7-bromocholesteryl benzoate. After the reaction had proceeded for 10 minutes, the solution was cooled to 45° C. and the water soluble components of the solution were removed by washing with water. The xylene solution was added to 785 ml. of acetone and chilled overnight at a temperature of from between —5° C. and —10° C. A yield of 9.0 grams of 7-dehydrosterol benzoate having a purity of 89.5% was obtained.

Examples I and II illustrate that when hexamethylene tetramine is employed as a dehydrohalogenation agent to dehydrohalogenate halogenated sterol compounds shorter reaction times are not only permissible, but excellent results are obtained when these shorter reaction times are employed. Therefore it is readily apparent that the use of hexamethylene tetramine as a dehydrohalogenation agent has many advantages. First, it is an excellent dehydrohalogenation agent. Secondly, it is commercially available and very inexpensive. Thirdly, it is in a high degree of purity when it is obtained, being impervious to deterioration on standing in the presence of light and air and requires no preliminary rectification prior to its use as a dehydrohalogenation agent. Moreover, since hexamethylene tetramine is commercially available and very inexpensive, it need not be recovered after the reaction. The steps requiring labor and equipment for the recovery of more costly and less available dehydrohalogenation agents are eliminated. Thus for this reason also, our process is highly economical.

From the above illustrative examples and the general description of the invention given herein, it is readily apparent that the present invention provides an excellent process for the dehydrohalogenation of halogenated sterol compounds and one which can be successfully carried out using a highly satisfactory and readily available dehydrohalogenating agent. Although the detailed examples hereinabove have dealt with the treatment of esters of cholesterol, the process of our invention can be applied to the treatment of any esters of any similar sterol or to any other sterol derivative in which the 3 position is protected by some other inactive group on the 3 position. Besides the ester group such as, for example, an ether group. The particular inactive group which is at the 3 position to protect that position from attack throughout the process of converting the sterol to a 7-dehydrosterol is entirely unimportant as far as the process of our invention is concerned inasmuch as the particular group which is on the 3 position in no way enters into the reaction which occurs between the halogenated sterol compound and the hexamethylene tetramine. Consequently the process of our invention is applicable to the dehydrohalogenation of any sterol derivative having an inactive group on the 3 position and having a double bond between the 5 and 6 carbon atoms and a halogen on the 7 carbon atom.

Having described our invention, what we claim as new and desire to secure by Letters Patent is:

1. In a process for producing a 7-dehydrosterol, the step which comprises heating a halogenated sterol derivative selected from the group consisting of halogenated sterol esters and halogenated sterol ethers which has a double bond between the 5 carbon atom and the 6 carbon atom and which has a halogen atom attached to the 7 carbon atom, at a temperature of at least about 80° C. in the presence of hexamethylene tetramine.

2. The process of claim 1, wherein said halogenated sterol derivative and said hexamethylene tetramine are heated in an inert hydrocarbon solvent.

3. The process of claim 2, wherein said inert hydrocarbon solvent is xylene.

4. In a process for producing a 7-dehydrosterol, the step which comprises heating a halogenated sterol ether which has a double bond between the 5 carbon atom and the 6 carbon atom and which has a halogen atom attached to the 7 carbon atom, at a temperature of at least about 80° C. in the presence of hexamethylene tetramine.

5. The process of claim 4, wherein said halogenated sterol ether and said hexamethylene tetramine are heated in an inert hydrocarbon solvent.

6. The process of claim 5, wherein said inert hydrocarbon solvent is xylene.

7. In a process for producing a 7-dehydrosterol, the step which comprises heating a halogenated sterol ester which has a double bond between the 5 carbon atom and the 6 carbon atom and which has a halogen atom attached to the 7 carbon atom, at a temperature of at least about 80° C. in the presence of hexamethylene tetramine.

8. The process of claim 7, wherein said halogenated sterol ester and said hexamethylene tetramine are heated in an inert hydrocarbon solvent.

9. The process of claim 8, wherein said inert hydrocarbon solvent is xylene.

10. The process of claim 8, wherein said halogenated sterol ester is an ester of cholesterol.

11. The process of claim 10, wherein said ester of cholesterol is 7-bromocholesteryl propionate.

12. The process of claim 10, wherein said ester of cholesterol is cholesterol benzoate.

13. The process of claim 12, wherein said ester of cholesterol is 7-bromocholesteryl benzoate.

14. The process of claim 10, wherein said ester of cholesterol is cholesterol acetate.

15. The process of claim 14, wherein said ester of cholesterol is 7-bromocholesteryl acetate.

No references cited.